(12) United States Patent
Ichiroku

(10) Patent No.: US 7,722,949 B2
(45) Date of Patent: May 25, 2010

(54) ADHESIVE COMPOSITION AND ADHESIVE FILM THEREFROM

(75) Inventor: Nobuhiro Ichiroku, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 422 days.

(21) Appl. No.: 11/806,776

(22) Filed: Jun. 4, 2007

(65) Prior Publication Data

US 2007/0282081 A1 Dec. 6, 2007

(30) Foreign Application Priority Data

Jun. 5, 2006 (JP) ............................... 2006-156459

(51) Int. Cl.
*C09J 163/00* (2006.01)
*C08L 63/00* (2006.01)
*C08G 59/06* (2006.01)

(52) U.S. Cl. ................ 428/355 EP; 523/400; 525/474; 525/476; 525/524; 525/525; 528/27; 528/30; 528/38; 528/106; 528/109; 528/119

(58) Field of Classification Search ........................ None
See application file for complete search history.

(56) References Cited

U.S. PATENT DOCUMENTS 6,525,160 B1 * 2/2003 Goda et al. ................... 528/29

FOREIGN PATENT DOCUMENTS

JP 2002-012818 A * 1/2002
JP 2006-005159 A * 1/2006
JP 2006-111701 A * 4/2006

OTHER PUBLICATIONS

Machine translation of JP 2002-012818 A, provided by the JPO website (2002).*

* cited by examiner

*Primary Examiner*—Michael J Feely
(74) *Attorney, Agent, or Firm*—Birch, Stewart, Kolasch & Birch, LLP

(57) ABSTRACT

An adhesive composition comprising: 100 parts by weight of (A) a phenoxy resin having, per molecule, at least one alkoxy silane residue represented by the following formula (I)

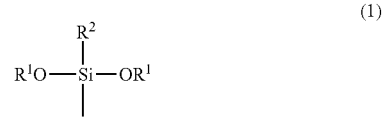

(1)

wherein $R^1$ may be the same with or different from each other and is a substituted or unsubstituted $C_{1-4}$ alkyl group, and $R^2$ is a substituted or unsubstituted $C_{1-9}$ monovalent group comprising a moiety selected from the group consisting of amino, cyanato, glycidoxy and thiol groups; 5 to 200 parts by weight of (B) an epoxy resin; a catalytic amount of (C) catalyst for curing the epoxy resin; and (D) an inorganic filler in an amount of from 33 to 300 parts by weight per total 100 parts by weight of the components (A), (B) and (C).

6 Claims, No Drawings

ADHESIVE COMPOSITION AND ADHESIVE FILM THEREFROM

CROSS REFERENCE

This application claims benefit of the Japanese Patent application No. 2006-156459 filed on Jun. 5, 2006, the contents of which are hereby incorporated by reference.

FIELD OF THE INVENTION

The present invention relates to an adhesive composition, specifically to an adhesive composition comprising a phenoxy resin which has been modified with alkoxysilane to have an epoxy-reactive group. The present invention also relates to an adhesive film comprising an adhesive layer prepared from the adhesive composition. The adhesive composition is suitable as a die bonding agent, and the adhesive film is suitable as a dicing and die bonding film, both used for a resin-encapsulated semiconductor package.

BACKGROUND OF THE INVENTION

A semiconductor device is generally prepared by the following processes:

i) dicing a large-diameter silicon wafer with a circuit pattern formed thereon in silicone chips, ii) thermocompression bonding the chip on a lead flame via a curable liquid adhesive, i.e., die bonding adhesive, to fix the chip, iii) wire bonding the electrodes of the chip to pads, and iv) encapsulating the chip for protecting the chip from the environment and handling facility.

The encapsulating is generally performed by resin transfer molding because of good productivity and low costs.

As miniaturization and multifunctionalization of electric and electronic appliances advances, an area array type package without a lead frame, for example, Chip Size Package (CSP), and stack type packages such as stacked CSP and System in Package (SiP) are more and more used. These packages are required to have higher resistance to thermal shock than those of conventional packages.

In addition, a reflow temperature for lead-free solder is as high as 265° C., requiring higher heat resistance. Among package constituents, a die bonding agent is relatively easy to be modified compared with other constituents, so that the modification of the die bonding agent aiming to lower thermal expansion coefficient, higher adhesion strength, and higher resistance to thermal shock is desired.

A composition comprising a polyimidesilicone resin is known to have excellent properties such as heat resistance from Japanese Patent Application Laid-Open No. 2006-5159. The silicone moiety of the composition contributes to the improved resistance to thermal shock. However, there still is room for improvement in some properties such as thermal expansion coefficient.

Another adhesive composition comprising a silicone moiety is an alkoxy-modified epoxy resin known from Japanese Patent Application Laid-Open No. 2006-111701. The resin is used for adhering a flexible circuit board.

SUMMARY OF THE INVENTION

An object of the present invention is to provide an adhesive composition which forms a cured product having low thermal expansion coefficient and high adhesion strength.

Another object of the present invention is to provide an adhesive film comprising a layer of the adhesive composition.

The present invention is an adhesive composition comprising 100 parts by weight of (A) a phenoxy resin having, per molecule, at least one alkoxy silane residue represented by the following formula (1)

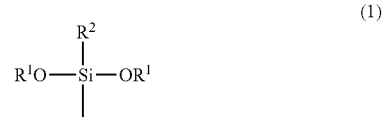

wherein $R^1$ may be the same with or different from each other and is a substituted or unsubstituted $C_{1-4}$ alkyl group, and $R^2$ is a substituted or unsubstituted $C_{1-9}$ monovalent group comprising a moiety selected from the group consisting of amino, cyanato, glycidoxy and thiol groups;

5 to 200 parts by weight of (B) an epoxy resin;

a catalytic amount of (C) catalyst for curing the epoxy resin; and (D) an inorganic filler in an amount of from 33 to 300 parts by weight per total 100 parts by weight of the components (A), (B) and (C).

Another aspect of the present invention is an adhesive film comprising a layer of the aforesaid adhesive composition.

Still another aspect of the present invention is a phenoxy resin, characterized in that the phenoxy resin comprises at least one repeating unit represented by the following formula (2) and has an average molecular weight of from 30,000 to 100,000:

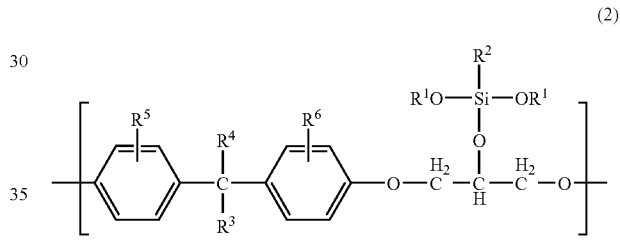

wherein $R^1$ may be the same with or different from each other and is a substituted or unsubstituted $C_{1-4}$ alkyl group, and $R^2$ is a substituted or unsubstituted $C_{1-9}$ monovalent group comprising a moiety selected from the group consisting of amino, cyanato, glycidoxy and thiol groups, and $R^3$, $R^4$, $R^5$ and $R^6$ are hydrogen atoms or substituted or unsubstituted $C_{1-4}$ monovalent hydrocarbon groups.

The aforesaid adhesive composition of the present invention can be readily thermocompression bonded. The composition forms a heat cured product strongly which is strongly adhered to a substrate and has low linear expansion coefficient. The adhesive film having a layer of the adhesive composition is useful as a dicing and die bonding tape. The phenoxy resin of the present invention has a functional group to be able to form a crosslinkage and can be used for various usages.

PREFERRED EMBODIMENTS OF THE INVENTION (A) Phenoxy Resin

The phenoxy resin (A) has at least one alkoxy silane residue represented by the following formula (1) per molecule.

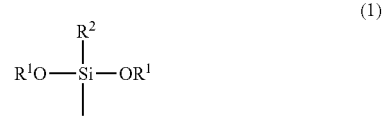

In the formula (1), $R^2$ is a substituted or unsubstituted $C_{1-9}$ monovalent group comprising a moiety selected from the group consisting of amino, cyanato, glycidoxy, and thiol groups. $R^2$ may be other epoxy-reactive group such as acid anhydride reside. The moiety such as amino group reacts with the epoxy resin(B) to form a cured product resistant to thermal shock. A phenoxy resin modified with an alkoxysilane comprising such an epoxy-reactive moiety and a composition comprising the phenoxy resin are not known. The epoxy-reactive group can be located at any site in $R^2$, but preferably at the terminal of $R^2$ because of higher reactivity with the epoxy resin. An amount of the alkoxysilane residue can be varied according to desired degree of resistance to heat shock.

Examples of $R^2$ include functional groups comprising an amino group such as γ-aminopropyl group, N-β-(aminoethyl) γ-aminopropyl group, and N-phenyl-γ-aminopropyl group; those comprising a cyanato group such as 2-cyanoethyl group; those comprising oxirane group such as γ-glycidoxypropyl group, β-(3,4-epoxycyclohexyl)ethyl group, glycidoxymethyl group, α-glycidoxymethyl group, β-glycidoxyethyl group, and β-glycidoxypropyl group; and those comprising acid anhydride residue such as propyl nadic acid residue, among which γ-glycidoxypropyl group is particularly preferred.

In the formula (1), $R^1$ may be the same with or different from each other and is a substituted or unsubstituted $C_{1-4}$ alkyl group. Examples of $R^1$ include alkyl groups such as methyl, ethyl, propyl, and butyl groups, among which methyl and ethyl groups are preferred.

As the phenoxy resin backbone, a bisphenol type phenoxy resin derived from epichlorohydrin and bisphenol A or F can be used. The phenoxy resin comprises alcoholic hydroxyl groups. The aforesaid alkoxysilane residue is bonded to an oxygen atom originating from the alcoholic hydroxyl group.

Preferably, the phenoxy resin (A) has 50 to 300, more preferably 100 to 250, repeating units represented by the following formula (2):

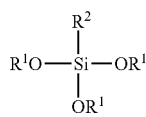

(3)

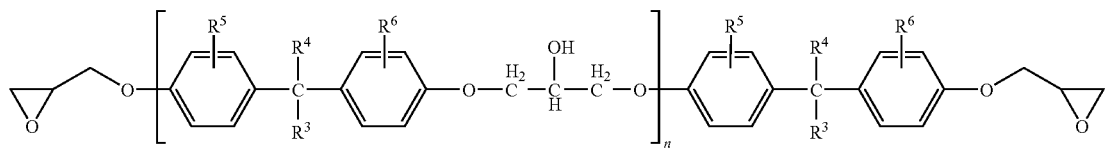

(4)

wherein $R^1$ and $R^2$ are as defined above, and $R^3$, $R^4$, $R^5$ and $R^6$ are hydrogen atoms or substituted or unsubstituted $C_{1-4}$ monovalent hydrocarbon groups. The phenoxy resin (A) may comprise a repeating unit without the alkoxy residue, for example, the one with hydrogen atom in place of the alkoxy residue, in addition to the repeating unit of the formula (2).

Examples of $C_{1-4}$ groups include $C_{1-4}$ alkyl groups such as methyl, ethyl, propyl and butyl groups, among which methyl group is preferred.

The phenoxy resin (A) can be prepared by reacting alkoxysilane represented by the formula (3) with a phenoxy resin represented by the formula (4).

In the formulas (3), $R^1$ and $R^2$ are as defined above. Examples of the alkoxysilane of the formula (3) include trialkoxysilanes such as glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropylmethyldiethoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)-methyltrimethoxysilane, (3,4-epoxycyclohexyl)-methyltriethoxysilane, β-(3,4-epoxycyclohexyl)-ethyltrimethoxysilane, β-(3,4-epoxycyclohexyl)-ethyltriethoxysilane, β-(3,4-epoxycyclohexyl)-ethyltripropoxysilane, β-(3,4-epoxycyclohexyl)-ethyltributoxysilane, β-(3,4-epoxycyclohexyl)-ethyltriphenoxysilane, γ-(3,4-epoxycyclohexyl)-propyltrimethoxysilane, γ-(3,4-epoxycyclohexyl)-propyltriethoxysilane, δ-(3,4-epoxycyclohexyl)-butyltrimethoxysilane, δ-(3,4-epoxycyclohexyl)-butyltrimethoxysilane; N-β-(aminoethyl) γ-aminopropyltrimethoxysilane, N-β-(aminoethyl)γ-aminopropylmethyldiethoxysilane, γ-aminopropyltrimethoxysilane, N-phenyl-γ-aminopropyltrimethoxysilane, trimethoxysilylpropylnadic anhydride, γ-mercaptopropyltrimethoxysilane, and γ-mercaptopropyltriethoxysilane.

As the phenoxy resin those having the phenoxy backbone as described above can be used.

The reaction for preparing the phenoxy resin (A) may be performed either in the presence of a solvent or without solvent. When $R^1$ is a methyl group, demethanolization reaction may be performed at a temperature of from 50 to 130° C., preferably from 70 to 110° C., for 1 to 15 hours. To prevent polymerization of alkoxysilane, the reaction is performed preferably under the anhydrous conditions. To promote reaction, a conventionally used catalyst can be used. Examples of the catalyst include metals such as lithium, sodium, potassium, rubidium, cesium, magnesium, calcium, barium, strontium, zinc, aluminum, titanium, cobalt, germanium, tin, lead, antimony, arsenic, cerium, boron, cadmium, and manganes;

(2)

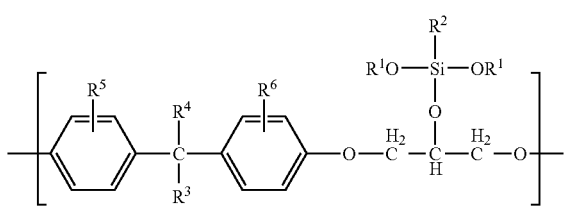

oxides of these metals, organic acid salts, halides, and methoxides. Preferred are organic tin compounds, particularly tin salts of organic acids such as dibutyl tin laurate and tin salt of octylic acid.

(B) Epoxy Resin

The epoxy resin used in the present invention (B) preferably has at least two epoxy groups per molecule. Examples of the epoxy resin include diglycidyl ethers of bis(4-hydroxyphenyl)methane and 2,2'-bis(4-hydroxyphenyl)propane or halides thereof, and polycondensates thereof (so-called bisphenol F type epoxy resins and bisphenol A type epoxy resins); butadiene diepoxide; vinylcyclohexene dioxide; diglycidyl ether of resorcin; 1,4-bis(2,3-epoxypropoxy)benzene; 4,4'-bis(2,3-epoxypropoxy)diphenyl ether; 1,4-bis(2,3-epoxypropoxy)cyclohexene; bis(3,4-epoxy-6-methylcyclohexylmethyl)adipate; epoxy glycidyl ethers or polyglycidyl esters obtained by condensation of 1,2-dihydroxybenzene (or resorcinol), polyhydric phenols or polyhydric alcohols with epichlorohydrin; epoxy novolac resins (i.e., novolac type epoxy resins) obtained by condensation of novolac type phenolic resins (or halogenated novolac type phenolic resins), such as phenol novolac and cresol novolac, with epichlorohydrin; polyolefins epoxidized by peroxidation process; epoxidized polybutadiene; naphthalene ring-containing epoxy resins; and epoxy resins of biphenyl type, phenol aralkyl type, biphenyl aralkyl type, and cyclopentadiene type.

A mono-epoxy compound can be incorporated in the composition in an amount not to adversely affect the composition of the present invention. Examples of the mono-epoxy compounds include styrene oxide, cyclohexene oxide, propylene oxide, methyl glycidyl ether, ethyl glycidyl ether, phenyl glycidyl ether, allyl glycidyl ether, octylene oxide and dodecene oxide, and mixtures thereof.

The epoxy resin (B) is contained in the composition in an amount of from 5 to 200 parts by weight, preferably from 10 to 100 parts by weight, per 100 parts by weight of the phenoxy resin (A). With the epoxy resin less than the aforesaid lower limit, satisfactory adhesion strength may not be attained. On the other hand, with the epoxy resin above the aforesaid upper limit, flexibility of a cured product may not be degraded.

(C) Catalyst for Curing the Epoxy Resin

The catalyst used in the present invention may be phosphorous catalysts or amine catalysts. Examples of the phosphorous catalysts include triphenylphosphine, phosphonium tetraphenyl borate, tetraphenyl phosphonium tetraphenyl borate, and the following compounds.

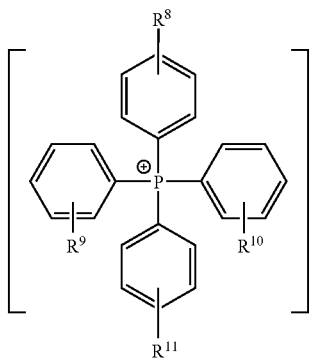

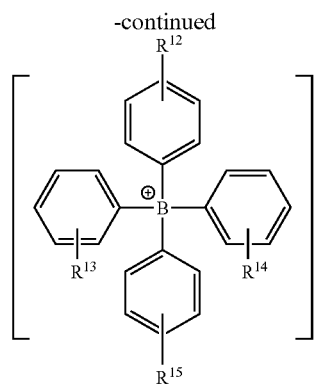

In the above formula, $R^8$ to $R^{15}$ are the same with or different from each other and selected from a hydrogen atom, halogen atoms, such as fluorine, bromine, and iodine, $C_{1-8}$ alkyl groups, alkenyl groups, alkynyl groups, alkoxy groups, and a phenyl group, which may be substituted, for example, trifluoromethyl group.

Examples of the amine catalysts include dicyandiamide and imidazole derivatives such as 2-methylimidazole, 2-ethyl-4-methylimidazole, 1-cyanoethyl-2-methylimidazole, and 2-phenyl-4,5-dihydroxymethylimidazole.

The catalyst for curing the epoxy resin may be a mixture of two or more of the aforesaid catalysts. A content of the catalyst is a catalytic amount, that is, an enough amount to promote the curing.

(D) Inorganic Filler

The inorganic filler (D) may be fillers commonly incorporated in an epoxy resin composition. The inorganic filler reduces a thermal expansion coefficient of a cured product of the adhesive composition and hence stress imposed on a semiconductor chip. Examples of the inorganic filler include silica fillers such as crushed or spherical fused silica, crystal silica, alumina, silicone nitride, and aluminum nitride. Preferably, the spherical filler or a blend of the spherical filler and the crushed filler is used in order to attain a low thermal expansion coefficient and a high packing density. Preferably, the inorganic filler is pretreated with a silane coupling agent.

(E) Curing Agent for the Epoxy Resin

As the curing agent for epoxy resin, any known curing agent can be used. Examples of the curing agent include amine compounds such as diethylenetriamine, triethylenetetramine, diethylaminopropylamine, N-aminoethylpiperazine, bis(4-amino-3-methylcyclohexyl)methane, meta-xylylenediamine, menthanediamine, and 3,9-bis(3-aminopropyl)-2,4,8,10-tetraoxaspiro(5,5)undecane; modified aliphatic polyamines such as epoxy resin-diethylenetriamine adduct, amine-ethylene oxide adduct, and cyanoethylated polyamine; phenolic resins having at least two phenolic hydroxyl groups per molecule, such as bisphenol A, trimethylol allyloxyphenol, phenol novolac resins having a low degree of polymerization, epoxidized or butylated phenolic resins, and phenolic resins available under the trade names of "Super Beckacite 1001", ex Japan Reichhold Chemical Co., Ltd., "Hitanol 4010", ex Hitachi Ltd., "Scado form L. 9", ex Scado Zwoll, Netherlands, and "Methylon 75108", ex General Electric Company; carbon resins available under the trade names of "Beckamine P. 138", ex Japan Reichhold Chemical Co., Ltd., "Melan", ex Hitachi Ltd., and "U-Van 10R", ex Toyo Koatsu Kogyo Co., Ltd.; amino resins such as melamine resins and aniline resins; polysulfide resins having at least two mercapto groups per molecule represented by the formula:

HS(C₂H₄OCH₂OC₂H₄SS)ₙC₂H₄OCH₂OC₂H₄SH, wherein n is an integer of 1 to 10; and organic acids and acid anhydrides thereof such as phthalic anhydride, hexahydrophthalic anhydride, tetrahydrophthalic anhydride, pyromellitic anhydride, methylnadic acid, dodecylsuccinic anhydride, and chlorendic anhydride. Of the aforesaid curing agents, phenolic resins are desired because they imparts good molding property and humidity resistance to the present composition as well as they are non-toxic and relatively less costly. The curing agent described above may be used alone or as a mixture of two or more of them, depending on curing efficiency.

The curing agent (E) is contained in the composition in such an amount that it does not interfere with the reaction between the phenoxy resin (A) and the epoxy resin (B). Generally, the content of the curing agent ranges from 1 to 100 parts by weight, particularly from 5 to 50 parts by weight, per 100 parts by weight of the epoxy resin. Less than 1 part by weight of the curing agent may not be enough to cure the composition. More than 100 parts by weight of the curing agent may cause problems, for example, high production costs, longer time required for curing due to dilution of the epoxy resin, and worse properties of a cured product.

The present composition can comprise conventionally used additives in amounts not to adversely affect the composition. Examples of the additives include colorants such as carbon black, inorganic or organic pigments, and dies; wetting agents, antioxidants, and heat stabilizers.

Methods of Preparation and Use of the Present Composition

The composition of the present invention can be prepared by mixing the aforesaid phenoxy resin (A), epoxy resin(B), catalyst (C), inorganic filler (D), and optional curing agent (E), with a known mixing means.

The adhesive composition of the present invention may be used in the form of solution in a polar aprotic solvent such as toluene, cyclohexanone or N-methylpyrrolidone. The solution is applied on a substrate and dried to from a film to which an object to be adhered is compression bonded, and then cured by heating. Alternatively, the solution is applied on a support film and dried to form a film with an adhesive layer provided thereon, herein after referred to as an adhesive film. The adhesive film is bonded via its adhesive layer to a circuit board and then the support film is peeled off from the adhesive layer. To the surface of the exposed adhesive layer, an object such as a silicon chip is thermocompression bonded and then heated to cure the adhesive. Examples of the support film include plastic films such as polyethylene, polypropylene, polyester, polyamide, polyimide, polyamideimide, polyetherimide, and polytetrafluoroethylene films; paper, metal foil, of which surface may be treated with a releasing agent or provided with a pressure sensitive adhesive layer.

Drying of the applied adhesive composition on a support film may be performed at a temperature of from room temperature to 200° C., preferably from 80° C. to 150° C., for 1 minute to 1 hour, preferably from 3 to 10 minutes. A thickness of the adhesive layer can be varied according to an intended use of the film and preferably ranges from 10 to 100 μm, more preferably from 15 to 50 μm. Thermocompression bonding of the object may be performed at a pressure of from 0.01 to 10 MPa, particularly from 0.1 to 2 MPa. Curing of the adhesive may be performed at a temperature of from 100 to 200° C., preferably from 120° C. to 180° C., for 30 minutes to 5 hours, preferably from 1 to 2 hours.

The adhesive film can be used as a dicing and die bonding tape. In a dicing process, the support film is peeled off and, to the exposed adhesive layer, a silicon wafer is thermocompression bonded. Thermocompression bonding is usually performed at a temperature of from 40 to 120° C. and a pressure of from 0.01 to 0.2 MPa. After dicing the wafer, a diced chip is picked up with a diced adhesive layer bonded to the backside of the chip, and thermocompression bonded to a lead frame via the adhesive layer which is then cured. Thermocompression bonding and curing may be performed in the same manner as described above.

In addition to the aforesaid dicing and die bonding tape, the adhesive composition of the present invention can be used for bonding various objects.

The present invention also provides a phenoxy resin which comprises at least one repeating unit represented by the following formula (2) and has an average molecular weight of from 30,000 to 100,000:

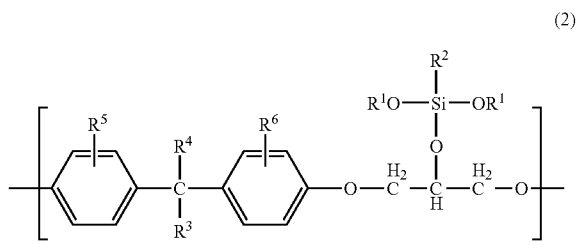

(2)

wherein R¹ may be the same with or different from each other and is a substituted or unsubstituted C₁₋₄ alkyl group, R² is a substituted or unsubstituted C₁₋₉ monovalent group comprising a moiety selected from the group consisting of amino, cyanato, glycidoxy and thiol groups, and R³, R⁴, R⁵ and R⁶ are hydrogen atoms or substituted or unsubstituted C₁₋₄ monovalent hydrocarbon groups. The phenoxy resin can be used for various applications in addition to an adhesive by varying the number of the alkoxysilane residue, R², and a substance to be reacted with the alkoxysilane residue.

EXAMPLES

The present invention will be explained with reference to the examples but not limited thereto.

Preparation of the Phenoxy Resin (A)

Preparation Example 1

In a reactor provided with a stirrer, ester adaptor, thermometer and nitrogen gas inlet, 40 g of a solid phenoxy resin, PKHH, ex Tomoe Engineering Co., Ltd., having a secondary alcohol equivalent of 286 g/eq. and Mw of 57000, and 60 g of cyclohexanone were placed and heated at 80° C. to melt the resin. To the mixture obtained, 27.8 g of γ-aminopropyltrimethoxysilane, KBM-903, ex Shin-Etsu Chemical Co., Ltd., and 0.1 g of dibutyl tin dilaurate as a catalyst were added, and subjected to demethanolization reaction at 100° C. for 8 hours under nitrogen gas flow. The reaction mixture obtained was cooled to 60° C. and subjected to a vacuum distillation to remove methanol. An alkoxysilane-modified phenoxy resin solution with a solid content of about 50% was obtained. As no ¹H-NMR peak around 3.85 ppm of phenolic hydroxyl group was detected in a ¹H-NMR spectrum of the resin dissolved in CDCl₃, the resin was confirmed to be modified with the alkoxysilane.

Preparation Example 2

In a reactor provided with a stirrer, ester adaptor, thermometer and nitrogen gas inlet, 40 g of a solid phenoxy resin, PKHH, ex Tomoe Engineering Co., Ltd., having a secondary alcohol equivalent of 286 g/eq. and Mw of 57000, and 60 g of cyclohexanone were placed and heated at 80° C. to melt the resin. To the mixture obtained, 13.9 g of γ-aminopropyltrimethoxysilane, KBM-903, ex Shin-Etsu Chemical Co., Ltd., and 0.1 g of dibutyl tin dilaurate as a catalyst were added, and subjected to demethanolization reaction at 100° C. for 8 hours under nitrogen gas flow. The reaction mixture obtained was cooled to 60° C. and subjected to a vacuum distillation to remove methanol. An alkoxysilane-modified phenoxy resin solution with a solid content of about 50% was obtained. In a $^1$H-NMR spectrum of the resin dissolved in $CDCl_3$, it was confirmed that 50% of phenolic OH peak around 3.85 ppm observed in $^1$H-NMR spectrum of the PKHH disappeared, indicating that the 50% of phenolic OH resin was modified with the alkoxysilane.

Preparation Example 3

In a reactor provided with a stirrer, ester adaptor, thermometer and nitrogen gas inlet, 40 g of a solid phenoxy resin, PKHH, ex Tomoe Engineering Co., Ltd., having a secondary alcohol equivalent of 286 g/eq. and Mw of 57000, and 60 g of cyclohexanone were placed and heated at 80° C. to melt the resin. To the mixture obtained, 25.6 g of γ-glycidoxypropyltrimethoxysilane, KBM-403, ex Shin-Etsu Chemical Co., Ltd., and 0.1 g of dibutyl tin dilaurate as a catalyst were added, and subjected to demethanolization reaction at 100° C. for 8 hours under nitrogen gas flow. The reaction mixture obtained was cooled to 60° C. and subjected to a vacuum distillation to remove methanol. An alkoxysilane-modified phenoxy resin solution with a solid content of about 50% was obtained. In a $^1$H-NMR spectrum of the resin dissolved in $CDCl_3$, it was confirmed that 50% of phenolic OH peak around 3.85 ppm observed in $^1$H-NMR spectrum of the PKHH disappeared, indicating that the 50% of phenolic OH resin was modified with the alkoxysilane.

Examples 1-5, Referential Example 1, Comparative Example 1

Adhesive compositions were prepared by mixing 50% solution of the phenoxy resin prepared in Preparation Examples 1, 2 or 3 in cyclohexanone, a bisphenol A type epoxy resin (RE310S, ex Nippon Kayaku Co.), dicyandiamide (DICY-7, ex Shikoku Chemical Co.), and spherical fused silica (a mean diameter of 13 μm, ex Tatsumori Co.) in the amounts as shown in Table 1, which amounts are indicated in solid contents, and diluted with cyclohexanone to prepare 70 wt % solution of an adhesive composition. The composition of Comparative Example 1 was prepared in the same manner as Examples except that the phenoxy resin (PKHH, ex Tomoe Engineering Co., Ltd.) was used in place of the phenoxy resin of Preparation Examples 1-3.

Preparation of the Adhesive Films

Each of the adhesive composition was applied on a 50 μm-thick PET film coated with a fluorinated silicone releasing agent and dried at 120° C. for 10 minutes. An adhesive film having about 50 μm-thick adhesive layer was obtained.

The adhesive layer was cured and then evaluated on the following properties. The results are as shown in Table 1.

Young's Modulus

An adhesive film obtained was cured at a temperature of 175° C. for 1 hour. A piece of film having a size of 20 mm×5 mm×50 μm was peeled off from the PET film and subjected to measurement of Young's modulus using a dynamic viscoelastometry instrument in a tension mode under the following conditions: chuck distance: 15 mm; determination temperature: 25° C.; and frequencies: 30 Hz.

Glass Transition Temperature (Tg)

Glass transition temperature of a 20 mm×5 mm×50 μm cured adhesive film prepared in the same manner as described above was measured with a thermomechanical analyzer, TMA-2000, ex ULVAC Inc., in a tension mode under the following conditions: chuck distance: 15 mm; determination temperature: 25-300° C.; temperature rise rate: 10° C./minute; and measuring load: 10 g.

Linear Expansion Coefficient at a Temperature of Tg or Lower

Linear expansion coefficient at a temperature of from 50 to 100° C. was measured on a 20 mm×5 mm×50 μm cured adhesive film prepared in the same manner as described above.

Adhesive Strength

A test piece consisting of a 5 mm×5 mm×50 μm adhesive layer sandwiched between two pieces of 18 mm×18 mm 42 alloy, ex Toppan Printing Co., Ltd., was prepared in the following manner: A 5 mm×5 mm piece was cut from the adhesive film prepared in the aforesaid manner. The adhesive layer of the piece was peeled off from the PET film and thermocompression bonded to an end of a first alloy piece at 80° C. and 0.01 MPa for 30 sec. On the adhesive layer, a second alloy piece was placed so as to form a straight line with the first alloy piece overlapped at its end of a 18 mm×5 mm wide area, and then thermocompression bonded to the adhesive layer in the aforesaid conditions. A shear adhesion strength (N/mm) was measured with a tensile strength tester, Autograph, ex Shimadzu Co., by pulling the ends of the both alloy pieces at a pull rate of 2.0 mm/min.

Adhesion Strength after Aging

A test piece prepared in the aforesaid manner was aged at 85° C. and at a relative humidity of 85% for 168 hours and an adhesion strength was measured in the same manner as above.

TABLE 1

|  | Examples | | | | | Ref. Ex.*[1] | Com. Ex.*[2] |
|---|---|---|---|---|---|---|---|
|  | 1 | 2 | 3 | 4 | 5 | 1 | 1 |
| (A) Phenoxy resin of Preparation Example 1 | 50 | 33.3 | 66.6 |  |  | 20 |  |
| (A) Phenoxy resin of Preparation Example 2 |  |  |  | 50 |  |  |  |
| (A) Phenoxy resin of Preparation Example 3 |  |  |  |  | 50 |  |  |
| (B) Epoxy resin | 47.5 | 63.3 | 31.6 | 47.5 | 47.5 | 76 | 47.5 |
| (c) Curing catalyst | 2.5 | 3.3 | 1.7 | 2.5 | 2.5 | 4 | 2.5 |
| (D) Inorganic filler | 100 | 100 | 100 | 100 | 100 | 100 | 100 |
| Phenoxy resin |  |  |  |  |  |  | 50 |
| Properties of cured composition | | | | | | | |
| Young's modulus, Mpa | 2000 | 1700 | 1800 | 1600 | 1700 | 1600 | 1500 |
| Glass transition temperature (Tg) | 140 | 135 | 135 | 130 | 135 | 125 | 120 |

TABLE 1-continued

|  | Examples | | | | | Ref. Ex.[*1] | Com. Ex.[*2] |
|---|---|---|---|---|---|---|---|
|  | 1 | 2 | 3 | 4 | 5 | 1 | 1 |
| Linear expansion coefficient, ppm, ≦ Tg | 30 | 35 | 35 | 40 | 35 | 120 | 100 |
| Adhesive strength | 19 | 21 | 16 | 18 | 18 | 21 | 16 |
| Adhesive strength after aging at 85° C./85% RH | 19 | 21 | 16 | 18 | 18 | 8 | 12 |

[*1]Referential Example
[*2]Comparative Example

As shown in Table 1, the cured products obtained from the composition of Examples 1 to 5 containing a phenoxy resin having an epoxy-reactive group showed higher Young's modulus and smaller linear expansion coefficient compared with the composition of Comparative Example 1. The composition of Referential Example 1 containing less phenoxy resin than the specified content in the present invention could not attain desired properties.

INDUSTRIAL APPLICABILITY

The adhesive composition of the present invention is useful as an adhesive for semiconductor package resistant to thermal shock. The adhesive film of the present invention is useful as a dicing and die bonding tape. Further, the phenoxy resin of the present invention can be used for various applications in combination with conventional resins such as an epoxy resin.

The invention claimed is:
1. An adhesive composition comprising
100 parts by weight of (A) a phenoxy resin
5 to 200 parts by weight of (B) an epoxy resin;
a catalytic amount of (C) catalyst for curing the epoxy resin; and
(D) an inorganic filler in an amount of from 33 to 300 parts by weight per total 100 parts by weight of the components (A), (B) and (C),
wherein the phenoxy resin (A) has 50 to 300 repeating units represented by the following formula (2):

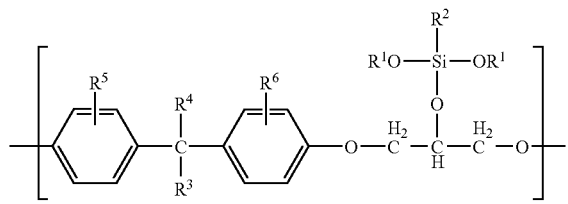

(2)

wherein $R^1$ may be the same with or different from each other and is a substituted or unsubstituted $C_{1-4}$ alkyl group, $R^2$ is a substituted or unsubstituted $C_{1-9}$ monovalent group comprising a moiety selected from the group consisting of amino, cyanato, glycidoxy and thiol groups, and $R^3$, $R^4$, $R^5$ and $R^6$ are hydrogen atoms or substituted or unsubstituted $C_{1-4}$ monovalent hydrocarbon groups.

2. The adhesive composition according to claim 1, wherein $R^2$ is selected from the group consisting of γ-glycidoxypropyl group, β-(3,4-epoxycyclohexyl)ethyl group, N-β-(aminoethyl)γ-aminopropyl group, γ-aminopropyl group and N-phenyl-γ-aminopropyl group.

3. An adhesive film comprising a layer of the adhesive composition according to any one of claims 1 and 2.

4. The adhesive composition according to claim 1, wherein the phenoxy resin (A) is prepared by reacting an alkoxysilane represented by the following formula (3) with a phenoxy resin represented by the following formula (4):

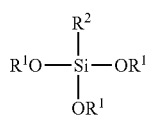

(3)

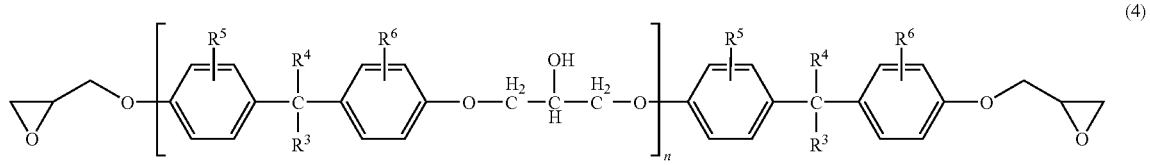

(4)

wherein $R^1$ may be the same with or different from each other and is a substituted or unsubstituted $C_{1-4}$ alkyl group, $R^2$ is a substituted or unsubstituted $C_{1-9}$ monovalent group comprising a moiety selected from the group consisting of amino, cyanato, glycidoxy and thiol groups, $R^3$, $R^4$, $R^5$ and $R^6$ are hydrogen atoms or substituted or unsubstituted $C_{1-4}$ monovalent hydrocarbon groups, and n is an integer of from 100 to 300.

5. A phenoxy resin, characterized in that the phenoxy resin comprises at least one repeating unit represented by the following formula (2) and has a weight average molecular weight of from 30,000 to 100,000:

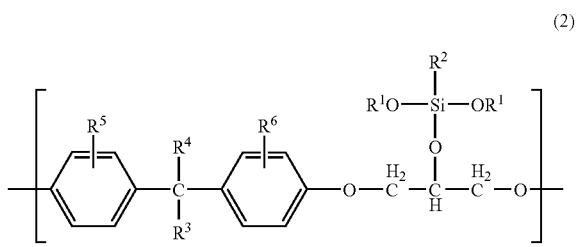

(2)

wherein $R^1$ may be the same with or different from each other and is a substituted or unsubstituted $C_{1-4}$ alkyl group, and $R^2$ is a substituted or unsubstituted $C_{1-9}$ monovalent group comprising a moiety selected from the group consisting of amino, cyanato, glycidoxy and thiol groups, and $R^3$, $R^4$, $R^5$ and $R^6$ are hydrogen atoms or substituted or unsubstituted $C_{1-4}$ monovalent hydrocarbon groups.

6. The phenoxy resin according to claim 5, wherein $R^2$ is selected from the group consisting of γ-glycidoxypropyl group, β-(3,4-epoxycyclohexyl)ethyl group, N-β-(aminoethyl)γ-aminopropyl group, γ-aminopropyl group and N-phenyl-γ-aminopropyl group.

* * * * *